US011409965B2

(12) United States Patent
Agarwal et al.

(10) Patent No.: US 11,409,965 B2
(45) Date of Patent: Aug. 9, 2022

(54) SEARCHING CONVERSATION LOGS OF A VIRTUAL AGENT DIALOG SYSTEM FOR CONTRASTIVE TEMPORAL PATTERNS

(71) Applicant: International Business Machines Corporation, Armonk, NY (US)

(72) Inventors: Shubham Agarwal, Cambridge, MA (US); Christian Muise, Somerville, MA (US); Joseph Kim, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 16/743,211

(22) Filed: Jan. 15, 2020

(65) Prior Publication Data

US 2021/0216724 A1    Jul. 15, 2021

(51) Int. Cl.
*G06F 40/35* (2020.01)
*G06F 16/9032* (2019.01)
*G06F 40/289* (2020.01)

(52) U.S. Cl.
CPC ........ *G06F 40/35* (2020.01); *G06F 16/90332* (2019.01); *G06F 40/289* (2020.01)

(58) Field of Classification Search
CPC ... G06F 40/38; G06F 16/90332; G06F 40/289
See application file for complete search history.

(56) References Cited

U.S. PATENT DOCUMENTS

| 6,346,879 | B1 | 2/2002 | Peled |
| 9,390,208 | B2 | 7/2016 | Armoni et al. |
| 2010/0205541 | A1 | 8/2010 | Rapaport et al. |
| 2011/0161310 | A1 | 6/2011 | Tang et al. |
| 2015/0178371 | A1 | 6/2015 | Seth et al. |
| 2015/0213373 | A1 | 7/2015 | Li et al. |
| 2017/0098269 | A1 | 4/2017 | Kim |
| 2018/0260384 | A1 | 9/2018 | Pasupalak et al. |
| 2019/0182382 | A1 | 6/2019 | Mazza et al. |
| 2019/0251165 | A1 | 8/2019 | Bachrach |
| 2020/0048741 | A1 | 1/2020 | Gupta |

FOREIGN PATENT DOCUMENTS

| CN | 106997375 A | 8/2017 |
| EP | 3617896 | 3/2020 |
| WO | 2019124647 | 6/2019 |
| WO | 20191332671 W | 7/2019 |

OTHER PUBLICATIONS

Carmona, Decomposed Process Discovery and COnformance Checking, Springer, 2018, p. 1-7 (Year: 2018).*

(Continued)

*Primary Examiner* — Sonia L Gay
(74) *Attorney, Agent, or Firm* — Lieberman & Brandsdorfer, LLC

(57) ABSTRACT

Embodiments are provided that relate to a computer system, a computer program product, and a machine-implemented method for improving performance of a dialog system employing an automated virtual agent. Embodiments involve clustering traces of dialog conversation logs into sets, and searching the traces for one or more contrastive temporal patterns between the sets.

19 Claims, 8 Drawing Sheets

(56) References Cited

OTHER PUBLICATIONS van der Aalst, Process Mining and Verfication of Properties: An Approach Based on Temproal Logic, Springer-Verlag, 2005, p. 130-147 (Year: 2005).*

Burattin, Conformance Checking Based on Multi-Perspective Declarative Prcess Models, arXiv, 2015, whole document (Year: 2015).*

Damer, Making Compliance Measures Actionable: a New Compliance Methodology, Lecture Notes in Business Information Process, 2011, whole document (Year: 2011).* de Leoni, A general process mining framework for correlating, predicting and clustering dynamic behavior based on event logs, Elsevier, 201, whole document (Year: 2015).*

PCT International Search Report and Written Opinion, PCT/IB2020/062080, dated Mar. 23, 2021.

Emieux, C., et al., "General LTL Specification Mining", 2015 30th IEEE/ACM International Conference on Automated Software Engineering (ASE), Nov. 2015.

Yang, J., et al., "Perracotta: Mining Temporal API Rules from Imperfect Traces", 28th International Conference on Software Engineering (ICSE 2006), May 2006.

Lo, D., et al., "Mining quantified temporal rules: Formalism, algorithms, and evaluation", Science of Computer Programming 77 (2012), pp. 743-759.

Haller, S., et al., "A Model for Cooperative Interactive Plan Explanations", Proceedings of the Tenth Conference on Artificial Intelligence for Applications, pp. 254-260, 1994.

Murali, V., et al., "What Gives? A Hybrid Algorithm for Error Trace Explanation", Time Refinement for Verification of Real-Time Object Code Programs, pp. 270-286, Jul. 2014.

Chakraborti, T., et al., "Plan Explanations as Model Reconciliation: Moving Beyond Explanation as Soliloquy", Proceedings of the Twenty-Sixth International Joint Conference on Artificial Intelligence (IJCAI—17), pp. 156-163, May 2017.

Patron, P., et al., "Plan proximity: an enhanced metric for plan stability", Association for the Advancement of Artificial Intelligence, 2009.

* cited by examiner

SEARCHING CONVERSATION LOGS OF A VIRTUAL AGENT DIALOG SYSTEM FOR CONTRASTIVE TEMPORAL PATTERNS

BACKGROUND

The present embodiments relate to a virtual dialog agent system employing an automated virtual dialog agent, such as, for example, a "chatbot," and a related computer program product and computer-implemented method. In certain exemplary embodiments, conversation log files from the system are used to improve performance of the automated virtual dialog agent.

A chatbot is a computer program that uses artificial intelligence (AI) as a platform to conduct a transaction between an automated virtual dialog agent and, typically, a user such as a consumer. The transaction may involve product sales, customer service, information acquisition, or other types of transactions. Chatbots interact with the user through dialog, often either textual (e.g., online or by text) or auditory (e.g., by telephone).

SUMMARY

The embodiments include a system, computer program product, and method for improving performance of a dialog system, in particular embodiments the improvements are directed to performance of an automated virtual dialog agent of the system.

In one aspect, a system is provided for use with a computer system including a processing unit, e.g. processor, and an artificial intelligence (AI) platform. The processing unit is operatively coupled to memory to receive a plurality of conversation log files relating to interactions with an automated virtual dialog agent of a dialog system, each of the conversation log files comprising a trace of one or more dialog events. The AI platform is in communication with the processing unit, and includes a trace manager to parse the dialog events of the traces of the conversation log files into a plurality of parsed events and extract respective behavioral characteristics from and assign respective behavioral characteristic values to the traces; a cluster manager, operatively coupled to the trace manager, to cluster the traces into a plurality of clusters based on proximity of the respective behavioral characteristics values of the traces to respective outcome values, the plurality of clusters comprising a first cluster of the traces having the respective behavioral characteristic values proximate to a first outcome value representing a first outcome and a second cluster of traces having the respective behavioral characteristic values proximate to a second outcome value representing a second outcome that is different than the first outcome; a search manager, operatively coupled to the cluster manager, to search the plurality of parsed events for a contrastive pattern, including applying a pattern specification entailing a temporal condition to at least one parsed event of the plurality of parsed events; and for the at least one parsed event, the search manager to determine whether the contrastive pattern satisfies a contrastive threshold, wherein the contrastive pattern is based on a first proportion of the traces of the first cluster for which the pattern specification holds true and a second proportion of the traces of the second cluster for which the pattern specification holds not true. Output from the AI platform is applied to the automated virtual dialog agent in relation to the dialog event corresponding to the at least one parsed event to improve performance of the dialog system.

In another aspect, a computer program product is provided for improving performance of a virtual dialog agent system. The computer program product comprises a computer readable storage medium having program code embodied therewith. The program code is executable by a processor to: receive a plurality of conversation log files relating to interactions with an automated virtual dialog agent of a dialog system, the conversation log files comprising respective traces comprising one or more dialog events; apply the received conversation log files to an artificial intelligence (AI) platform comprising a learning program to parse the dialog events of the traces of the conversation log files into a plurality of parsed events, extract respective behavioral characteristics from and assign respective behavioral characteristic values to the traces, cluster the traces into a plurality of clusters based on proximity of the respective behavioral characteristics values of the traces to respective outcome values, the plurality of clusters comprising a first cluster of the traces having the respective behavioral characteristic values proximate to a first outcome value representing a first outcome and a second cluster of traces having the respective behavioral characteristic values proximate to a second outcome value representing a second outcome that is different than the first outcome, search the plurality of parsed events for a contrastive pattern, the searching comprising applying a pattern specification entailing a temporal condition to at least one parsed event of the plurality of parsed events; and for the at least one parsed event, determine whether the contrastive pattern satisfies a contrastive threshold, the contrastive pattern based on a first proportion of the traces of the first cluster for which the pattern specification holds true and a second proportion of the traces of the second cluster for which the pattern specification holds not true. Output from the AI platform is applied to the automated virtual dialog agent in relation to the dialog event corresponding to the at least one parsed event to improve performance of the dialog system.

In yet another aspect, a computer-implemented method is provided of improving performance of a dialog system. The method comprises: receiving, by a processor of a computing device, a plurality of conversation log files relating to interactions with an automated virtual dialog agent of a dialog system, the conversation log files comprising respective traces comprising one or more dialog events; and applying, by the processor, the received conversation log files to an artificial intelligence (AI) platform comprising a learning program. The applying comprises: parsing the dialog events of the traces of the conversation log files into a plurality of parsed events; extracting respective behavioral characteristics from and assigning respective behavioral characteristic values to the traces; clustering the traces into a plurality of clusters based on proximity of the respective behavioral characteristics values of the traces to respective outcome values, the plurality of clusters comprising a first cluster of the traces having the respective behavioral characteristic values proximate to a first outcome value representing a first outcome and a second cluster of traces having the respective behavioral characteristic values proximate to a second outcome value representing a second outcome that is different than the first outcome; searching the plurality of parsed events for a contrastive pattern, the searching comprising applying a pattern specification entailing a temporal condition to at least one parsed event of the plurality of parsed events; and for the at least one parsed event, determining whether the contrastive pattern satisfies a contrastive threshold, wherein the contrastive pattern is based on a first proportion of the traces of the first cluster for which the pattern specification holds true and a second proportion of the traces of the second cluster for which the pattern specification holds not true. The method further comprises refining the automated virtual dialog agent in relation to the dialog event corresponding to the at least one parsed event to improve performance of the dialog system.

These and other features and advantages will become apparent from the following detailed description of the presently exemplary embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
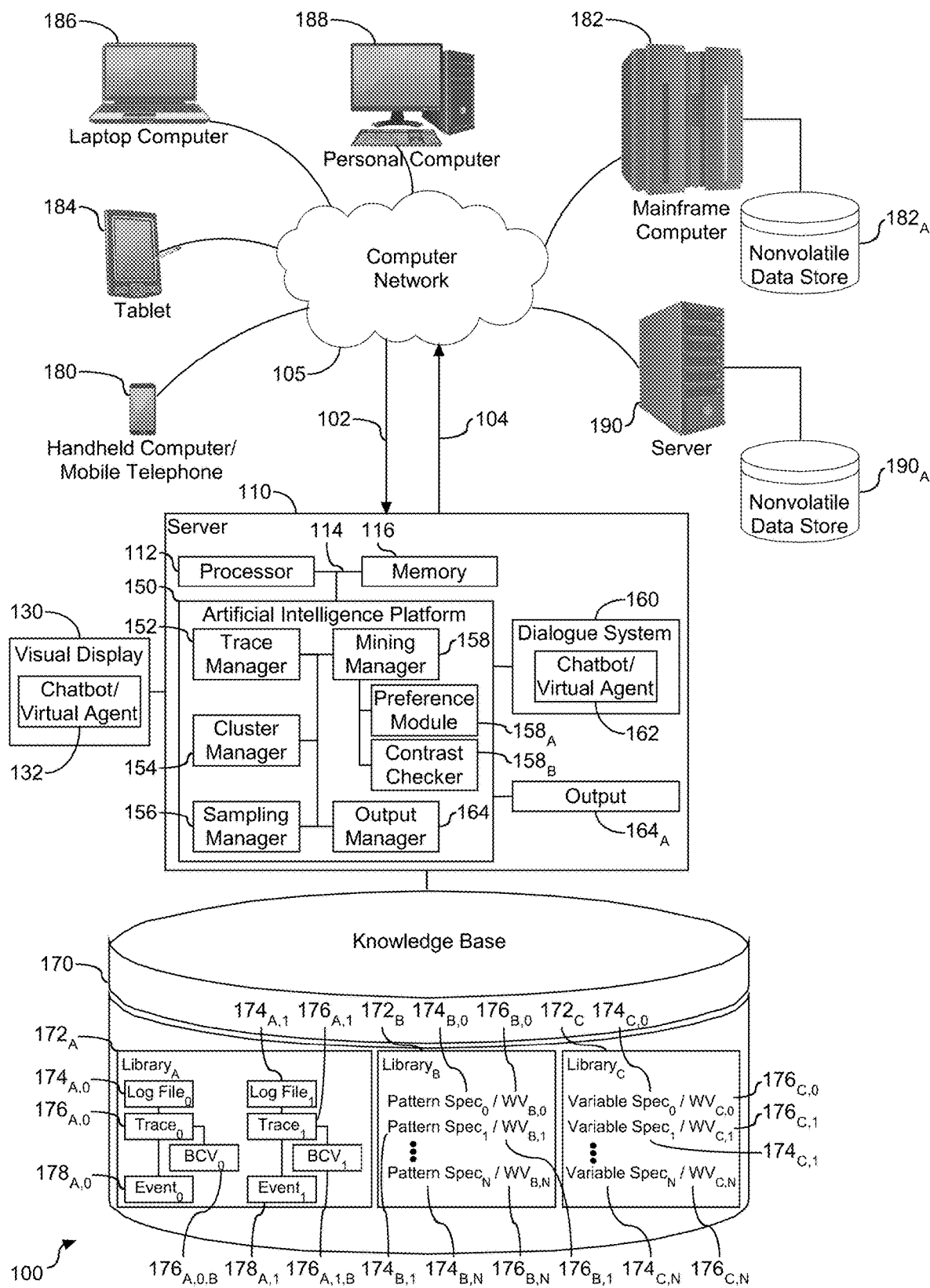
FIG. 1 depicts a system diagram illustrating an artificial intelligence platform computing system in a network environment.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificially intelligent computer systems, natural language systems (such as the IBM Watson® artificially intelligent computer system or and other natural language systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data minimum, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

A chatbot is an Artificial Intelligence (AI) program that simulates interactive human conversation by using pre-calculated phrases and auditory or text-based signals. Chatbots are increasingly used in electronic platform for customer service support. In one embodiment, the chatbot may function as an intelligent virtual agent. Each chatbot experience is comprised of a set of communications comprised of user actions and dialog system actions, with the experience having a discriminative behavior pattern. It is understood in the art that chatbot dialogs may be evaluated and subject to diagnosis to ascertain elements of the chatbot that may warrant changes to improve future chatbot experiences. Such evaluations identify patterns of behavior. By studying these patterns, and more specifically by identifying different characteristics of the patterns, the chatbot program may be refined or amended to improve chatbot metrics and future chatbot experiences.

One aspect of chatbot evaluation is directed at examination of an underlying dialog to identify how two sets of dialogs differ in behavior. The dialog is comprised of a series of communications in which a dialog trace, e.g. trace, is a characterization of the dialog. In one embodiment, dialogs are clustered based on their trace. The examination generates a corresponding explanation by discovering logical specifications that are entailed by one set of dialog, but not the other set of dialogs. In one embodiment, the examination may detect anomalies in the chatbot platform that can be corrected or improved. Accordingly, the system, computer program product, and method described in detail herein with the corresponding drawings focus on explaining differences between multiple dialogs, and refining the dialog program code to mitigate failure of the chatbot platform and improve the dialog experience.

Referring to FIG. 1, a schematic diagram of an artificial intelligence (AI) platform and corresponding system (100) is depicted. As shown, a server (110) is provided in communication with a plurality of computing devices (180), (182), (184), (186), (188), and (190) across a network connection, e.g. computer network, (105). The server (110) is configured with a processing unit, e.g., a processor, in communication with memory across a bus. The server (110) is shown with an AI platform (150) operatively coupled to a dialog system (160), shown herein with a virtual dialog agent (162), as a chatbot, a knowledge base (170). A visual display (130), such as a computer screen or smartphone, is provided for allowing the user to interface with a representation of a virtual agent, e.g. chatbot, (132) on the display (130). While a visual display is illustrated in FIG. 1, it should be understood that the display (130) may be replaced or supplemented by other interface(s), such as an audio interface (e.g., a microphone and speaker), an audio-video interface, etc.

The AI platform (150) is operatively coupled to the network (105) to support interaction with the virtual dialog agent (162) from one or more of the computing devices (180), (182), (184), (186), (188), and (190). More specifically, the computing devices (180), (182), (184), (186), and (188) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, sub-systems, and/or devices other than those that are depicted herein.

The AI platform (150) is shown herein operatively coupled to the dialog system (160), which is configured to receive input (102) from various sources. For example, the dialog system (160) may receive input across the network (105) and leverage a data source (170), also referred to herein as a knowledge base or corpus of information, to create output or response content.

As shown, the data source (170) is configured with library ($172_A$) of conversation log files (also referred to as records), with each log file recording interactions with the virtual dialog agent. According to an exemplary embodiment, each conversation log, e.g., log file, is a recording of a (historical) trace from a chatbot, which includes a dialog in an electronic platform between a user and a virtual agent. The trace includes one or more dialog events, also referred to as state variables. By way of example, in the context of a chatbot platform for booking a vacation, dialog events or state variables may include a field such as a date and time of departure, and the state variable instantiation may be the information or data entered by the user for the date and time of departure. Other state variables for such a chatbot might include the date and time of return, the destination location, vehicle rental, hotel reservation, etc.

As shown herein, the first $library_A$ (172) includes a plurality of log files, including $log\ file_0$ ($174_{A,0}$) and $log\ file_1$ ($174_{A,1}$). Although only two log files are shown, the quantity should not be considered limiting. Indeed, it is contemplated that the library ($172_A$) may contain hundreds or thousands of log files. $Log\ file_0$ ($174_{A,0}$) and $log\ file_1$ ($174_{A,1}$) are shown with corresponding traces, shown herein as $trace_0$ ($176_{A,0}$) and $trace_1$ ($176_{A,1}$), respectively. Similarly, each trace includes a behavior characteristic value (BCV) and one or more dialog events (including state variable instantiations). For example, $trace_0$ ($176_{A,0}$) and $trace_1$ ($176_{A,1}$) are shown with corresponding behavior characteristic values $BVC_0$ ($176_{A,0,B}$) and $BCV_1$ ($176_{A,1,B}$), respectively. In FIG. 1, $trace_0$ ($176_{A,0}$) is shown with dialog event(s)$_0$ ($178_{A,0}$) and $trace_1$ ($176_{A,1}$) is shown with dialog event(s)$_1$ ($178_{A,1}$). The automated virtual dialog agent (162) may pose each of the state variables to the user as a query, with the user providing a response in the form of a state variable instantiation.

As further shown in FIG. 1, the data source (170) is configured with a second $Library_B$ ($172_B$) and a third $Library_C$ ($172_C$). Although the data source (170) is shown with three libraries ($172_A$, $172_B$, and $172_C$), it should be understood that the libraries may be combined or divided into any number of libraries, and that additional libraries may be accessed. For example, $Library_B$ ($172_B$) and $Library_C$ ($172_C$) may be combined into a single library. Alternatively, either or both of $Library_B$ ($172_B$) and $Library_C$ ($172_C$) may comprise a plurality of libraries. $Library_B$ ($172_B$) contains a plurality of files each including a pattern specification and optionally a weighted value (WV) associated with the pattern specification. As shown, $Library_B$ ($172_B$) includes Pattern $Spec_0$ ($174_{B,0}$) with associated weighted value $WV_{B,0}$ ($176_{B,0}$), Pattern $Spec_1$ ($174_{B,1}$) with associated $WV_{B,1}$ ($176_{B,1}$), and Pattern $Spec_N$ ($174_{B,N}$) with associated $WV_{B,N}$ ($176_{B,N}$). $Library_C$ ($172_C$) contains a plurality of files including variable specifications and optionally weighted values (WV) associated with the variable specifications. As shown, $Library_C$ ($172_C$) includes Variable $Spec_0$ ($174_{C,0}$) with associated $WV_{C,0}$ ($176_{C,0}$), Variable $Spec_1$ ($174_{C,1}$) with associated $WV_{C,1}$ ($176_{C,1}$), and Variable $Spec_N$ ($174_{C,N}$) with associated $WV_{C,N}$ ($176_{C,N}$). Although shown with three files, each of the $Library_B$ ($172_B$) and the $Library_C$ ($172_C$) may include fewer or more files, including, for example, tens, hundreds, or thousands of files.

The pattern specifications (e.g., Pattern $Spec_0$ ($174_{B,0}$), Pattern $Spec_1$ ($174_{B,1}$), Pattern $Spec_N$ ($174_{B,N}$)) of the files of $Library_B$ ($172_B$) may entail a temporal condition, e.g., employ temporal logic. In exemplary embodiments, linear temporal logic (LTL) is employed for one or more, if not each, of the pattern specifications ($174_{B,0}$, $174_{B,1}$, ... $174_{B,N}$) of $Library_B$ ($172_B$). For example, the LTL may be a condition that always holds through the conversation trace, a condition that follows or is preceded by another condition, or other examples of LTL. The variable specifications ($174_{C,0}$, $174_{C,1}$, ... $174_{C,N}$) of the files of $Library_C$ ($172_C$) may include fields of information (or state variables) typically involved in an interaction or transaction with a virtual agent such as a chatbot. The weighted values (WVs) of the files of $Library_B$ ($172_B$) and $Library_C$ ($172_C$) are optional. In exemplary embodiments, different weighted values are assigned to different pattern specifications and variable specifications depending on the perceived importance of the associated pattern specification or variable specification. In an exemplary embodiment, the weighted values are in a range of 0 to 1, including any tenth and/or hundredth there between.

The various computing devices (180), (182), (184), (186), (188), and (190) in communication with the network (105) may include access points to the dialog system (160). The network (105) may include local network connections and remote connections in various embodiments, such that the AI platform (150) may operate in environments of any size, including local and global, e.g., the Internet. Additionally, the AI platform (150) serves as a back-end system that can make available a variety of knowledge extracted from or represented in documents, network accessible sources and/or structured data sources. In this manner, some processes populate the AI platform (150), with the AI platform (150) also including input interfaces to receive requests and respond accordingly.

As shown, content may be in the form of one or more log files (used interchangeably with "records") operatively coupled to the AI platform (150) via the knowledge base (170). Content users may access the AI platform (150) and the operatively coupled dialog system (160) via a network connection or an Internet connection to the network (105), and may submit natural language input to the AI platform (150) that may effectively determine an output response related to the input by leveraging the knowledge base (170) and the tools that comprise the AI platform (150).

The AI platform (150) is shown herein with several tools to support the dialog system (160) and the corresponding virtual agent (e.g., chatbot) (162), and more specifically, with the tools directed at improving performance of the dialog system (160) and virtual agent (162) experience. The AI platform (150) employs a plurality of tools to interface with and support improving performance of the virtual agent (162). The tools include a trace manager (152), a cluster manager (154), a sampling manager (156), a search manager (158), and an output manager (164).

The trace manager (152) parses the dialog events of the traces of the conversation log files into a plurality of parsed events including state variable instantiations. The trace manager (152) further extracts behavioral characteristics from the traces and assigns a respective behavioral characteristic value to each of the traces. As shown herein, trace$_0$ ($176_{A,0}$) is shown with a corresponding behavioral characteristic value (BCV$_0$) ($176_{A,0,B}$), and trace$_1$ ($176_{A,1}$) is shown with a corresponding behavioral characteristic value (BCV$_1$) ($176_{A,1,B}$).

The cluster manager (154) clusters the traces into a plurality of clusters (or groups) based on proximity of the respective behavioral characteristics values of the traces to respective outcome values. The plurality of clusters include a first cluster associated with a first outcome value representing a first outcome and a second cluster associated with a second outcome value representing a second outcome that is different than (and optionally opposite to) the first outcome. The first and second outcomes may be, for example, successful completion of an interaction and unsuccessful completion of an interaction, respectively. The traces clustered in the first cluster have respective behavior characteristic values proximate (e.g., identical) to the first outcome value, while the traces clustered in the second cluster have respective behavior characteristic values proximate (e.g., identical) to the second outcome value. For example, in the case of a chatbot used for booking a vacation, the first outcome value may represent an outcome in which the vacation was successfully booked (wherein the behavior characteristic value equals 0), whereas the second outcome value may represent an outcome in which the vacation was not successfully booked (wherein the behavior characteristic value equals 1). In an exemplary embodiment, the first and second outcome values are 0 and 1. While the above example includes two outcomes, it should be understood that embodiments include three or more outcomes, e.g., a third outcome in which the destination accommodations (e.g., a resort) was successfully booked but the travel reservations (e.g., flights) were not booked.

According to an embodiment, the sampling manager (156) selects a subset of traces of the first cluster and a subset of traces from the second cluster for further processing. The sampling manager (156) is particularly useful where traces from a large number of conversation log files are clustered. The sampling manager (156) may sample using any sampling technique, including random sampling. Sampling managers are known in the art, and therefore not discussed in further detail.

The search manager (158) explores the plurality of parsed events (or state variables) of the sampled traces. In an exemplary embodiment, the search manager (158) includes a preference module ($158_A$) and a contrast checker ($158_B$). The preference module ($158_A$) accesses Library$_B$ ($172_B$) to select a pattern specification and associated weighted value (e.g., Pattern Spec$_0$ ($174_{B,0}$) with associated WV$_{B,0}$ ($176_{B,0}$)) and accesses Library$_C$ ($172_C$) to select a variable specification and associated weighted value (e.g., Variable Spec$_0$ ($174_{C,0}$) with associated WV$_{C,0}$ ($176_{C,0}$)). The preference module ($158_A$) of the search manager (158) applies the selected pattern specification entailing a temporal condition and the selected variable specification to the parsed events of the sample traces of the first cluster to determine a first proportion of the sample traces of the first cluster for which the parsed event(s) corresponding to the selected variable specification satisfies the temporal condition of the selected pattern specification. The preference module ($158_A$) of the search manager (158) further applies the same selected pattern specification entailing the same temporal condition and the same selected variable specification to the parsed events of the sample traces of the second cluster to determine a second proportion of the sample traces of the second cluster for which the parsed event(s) corresponding to the selected variable specification does not satisfy the temporal condition of the selected pattern specification.

The contrast checker ($158_B$) of the search manager (158) determines whether a contrastive threshold, typically a value between 0 and 1 and optionally predetermined by the programmer, including any tenth or hundredth there between, is satisfied based on the first proportion of the traces of the first cluster and the second proportion of the traces of the second cluster. Determination of satisfaction of the contrastive threshold value involves, according to an exemplary embodiment, multiplying the first and second proportions together to calculate a product, and assessing whether the calculated product is equal to or greater than the contrastive threshold value. If one or more weighting values are to be considered, then determination of satisfaction of the contrastive threshold value involves, according to another exemplary embodiment, multiplying the first proportion, the second proportion, and the weighting value(s) together to calculate a weighted product, and assessing whether the calculated weighted product is equal to or greater than the contrastive threshold value.

The output manager (164) according to an exemplary embodiment provides output ($164_A$) for readout on the visual display (130). According to another embodiment, the output manager (164) automatically refines the dialog system (160), and in an exemplary embodiment the automated virtual dialog agent (162) of the dialog system (160), in connection with the variable specification used for search with the search manager (158). According to an embodiment, the refinement of the dialog system involves selectively imposing a checkpoint within the dialog with respect to the variable specification used for search with the search manager (158). According to another embodiment, refinement of the dialog system (160) involves changing the queries posed by the virtual agent (162). The refinement can be implemented automatically by the output manager (164) or may be implemented by a programmer.

When the log file (record) is received, the trace manager (152) can use a variety of protocols to parse the dialog events of the corresponding trace of the received log file, including identify content within the trace based on the relation between signifiers, such as words, phrases, signs, and symbols, and what they stand for, their denotations, or connotation. The trace manager (152) is shown herein as a tool embedded within the artificial intelligence platform (150) and, according to an embodiment, utilizes natural language processing protocols.

The traces of received log files may be processed by the IBM Watson® server (110), and the corresponding artificial intelligence platform (150). As shown herein, the trace manager (152) performs an analysis on the language of the trace using a variety of reasoning algorithms. There may be hundreds or even thousands of reasoning algorithms applied, each of which performs different analysis, e.g., comparisons. For example, some reasoning algorithms may look at matching of terms and synonyms within the language of the received trace and the found portions of the corpus of data. In one embodiment, the trace manager (154) may process the electronic communication into word vector representations to identify and extract features within the communication. Whether through use of word vector representations, or an alternative platform for processing electronic records, the NL manager (152) processes the electronic record in an effort to identify parsed events and a behavioral characteristic of the trace. In one embodiment, the platform identifies grammatical components, such as nouns, verbs, adjectives, punctuation, punctuation marks, etc. in the electronic records. Similarly, in one embodiment, one or more reasoning algorithms may look at temporal or spatial features in language of the electronic records.

In some illustrative embodiments, server (110) may be the IBM Watson® system available from International Business Machines Corporation of Armonk, N.Y., augmented with the mechanisms of the illustrative embodiments described hereafter.

The sampling manager (156) induces sampling on the traces from the formed clusters. Sampling may be random or may involve any sampling technique, including those known in the art. In an embodiment, a first select quantity of sample traces is assigned to the first cluster and a second select quantity of sample traces is assigned to the second cluster, $cluster_1$.

The search manager (158) assesses whether information leveraged from the cluster formation and evaluation satisfies a contrastive threshold. The contrast checker ($158_B$) operates to multiply the proportions of the first and second clusters by one another to provide a product value. Optionally, the contrast checker ($158_B$) multiplies the product value by one or more weighting factors to determine a weighed product. According to exemplary embodiments, each of the weighting factors is in a range of 0 to 1, including all tenths or hundredths there between. According to an embodiment, a weighting factor is a pattern specification weighting factor based on, e.g., the importance assigned to the pattern specification. According to another embodiment, the weighting factor is a variable specification weighting factor based on, e.g., the importance assigned to the variable specification. For example, the variable specification relating to satisfaction of the departure dates may have high importance to the programmer and hence be assigned a weighting value near 1, wherein the variable specification relating to the satisfaction of a vehicle rental may have low importance and hence be assigned a weighting value near 0. In one embodiment, the weight application to the pattern specification and/or the variable specification may be omitted or set to 1. Similarly, in one embodiment, a value of the weight may be configurable.

A contrastive threshold is assigned. Optionally, the contrast checker ($158_B$) assigns the contrastive threshold, although it may be assigned by the programmer. In exemplary embodiments, the contrastive threshold is a value in a range of 0 to 1, including any increment (e.g., tenth, hundredth, etc.) within the range of 0 to 1. The contrast checker ($158_B$) of the search manager (158) determines if the weighted product satisfies, e.g., equals or is greater than, the contrastive threshold.

If the weighted product satisfies the contrastive threshold, the output manager (164) creates output corresponding to a refinement to the virtual agent in association with the parsed event(s) to improve performance of the dialog system. On the other hand, if the weighted product does not satisfy the contrastive threshold, the AI platform (150) or the programmer may take various steps for continuing, including, for example, assigning a new contrastive threshold and returning to step (412) and (432); selecting another pattern specification and/or variable specification; and ending the process.

The trace manager (152), the cluster manager (154), the sampling manager (156), the search manager (158), and the output manager (164) hereinafter referred to collectively as AI tools, are shown as being embodied in or integrated within the artificial intelligence platform (150) of the server (110). The AI tools may be implemented in a separate computing system (e.g., 190) that is connected across network (105) to the server (110). Wherever embodied, the AI tools function to evaluate dialog log records, parse dialog events of traces of the dialog log records into parsed events, extract behavior characteristics from the traces and assign values to the behavior characteristics, cluster the traces, sample the clustered traces, and determine whether a contrastive threshold is satisfied with respect to the sampled traces.

In selected example embodiments, the trace manager (152) may be configured to apply NL processing to identify the behavior characteristics of the traces of the received dialog log records. For example, the trace manager (152) may perform a sentence structure analysis, with the analysis entailing a parse of the subject sentence(s) and the parse to denote grammatical terms and parts of speech. In one embodiment, the trace manager (152) may use a Slot Grammar Logic (SGL) parser to perform the parsing. The trace manager (152) may also be configured to apply one or more learning methods to match detected content to known content to decide and assign a value to the behavior characteristic.

Types of information handling systems that can utilize the artificial intelligence platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various information handling systems can be networked together using computer network (105). Types of computer network (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (190) utilizes nonvolatile data store ($190_A$), and mainframe computer (182) utilizes nonvolatile data store ($182_A$). The nonvolatile data store ($182_A$) can be a component that is external to the various information handling systems or can be internal to one of the information handling systems.

The information handling system employed to support the artificial intelligence platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 2:
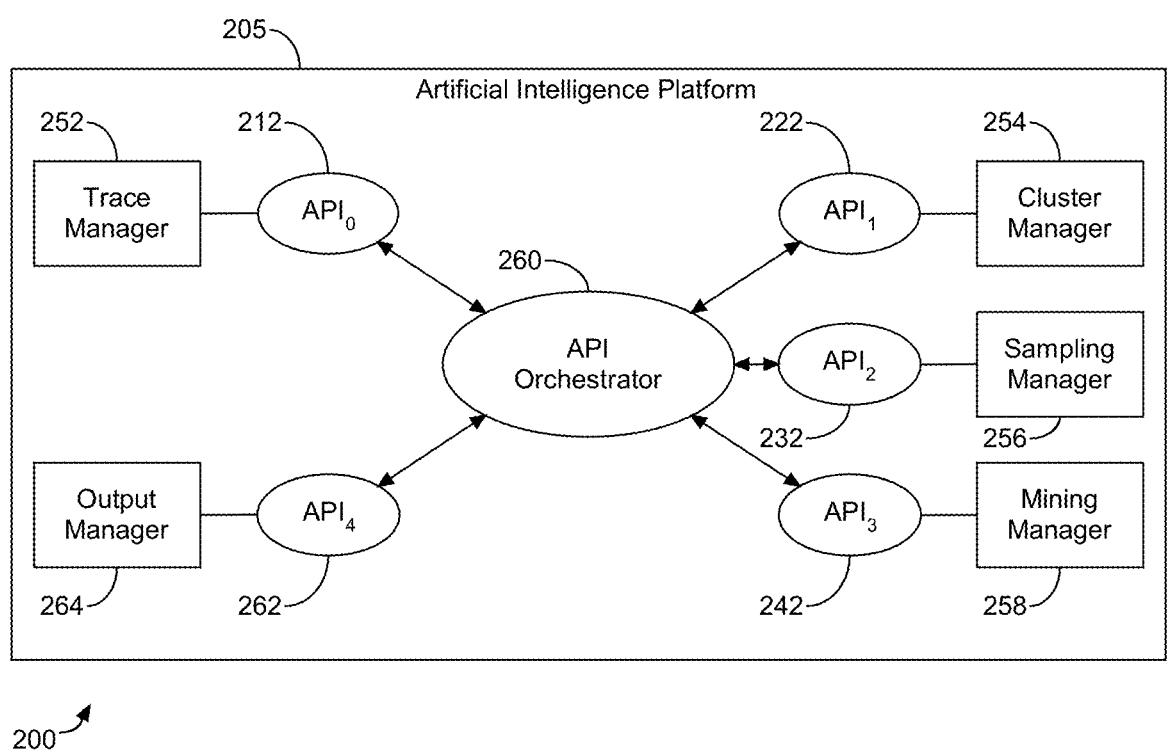
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the artificial intelligence platform (150) shown and described in FIG. 1, one or more APIs may be utilized to support one or more of the tools (152), (154), (156), (158), and (164) and their associated functionality. Referring to FIG. 2, a block diagram (200) is provided illustrating the tools (152), (154), (156), (158), and (164), and their associated APIs. As shown, a plurality of tools are embedded within the AI platform (205), with the tools including the trace manager (252) associated with $API_0$ (212), the cluster manager (254) associated with $API_1$ (222), the sampling manager (256) associated with $API_2$ (232), the search manager (258) associated with $API_3$ (242), and the output manager (264) associated with $API_4$ (262). Each of the APIs may be implemented in one or more languages and interface specifications. $API_0$ (212) provides functional support to parse dialog events of the traces and determine behavior characteristics of traces; $API_1$ (222) provides functional support to cluster the traces; $API_2$ (232) provides functional support to sample the traces; $API_3$ (242) provides functional support to search, e.g. explore, the parsed events; and $API_4$ (262) provides functional support over output, including refining the dialog system. As shown, each of the APIs (212), (222), (232), (242), and (262) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
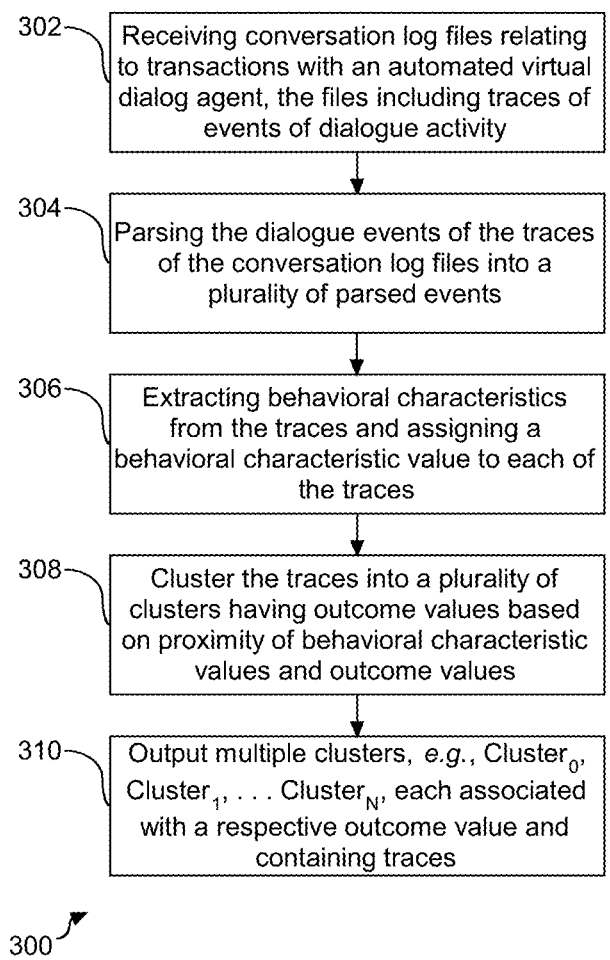
FIG. 3 depicts a flowchart illustrating an embodiment of a method of clustering traces of dialog logs.

Referring to FIG. 3, a flowchart (300) is provided to illustrate a process for processing conversation log files (also referred to herein as records) of a dialog system, such as a chatbot platform, and subjecting corresponding traces to a clustering process. As shown, input in the form of conversation log files is received for processing (302). The conversation log files may relate to various types of transactions, interactions, and activities, including, for example, a product sale, purchase of services, customer service, information acquisition, etc. According to an exemplary embodiment, each conversation log file is a recording of a trace from a chatbot, which includes a dialog in an electronic platform between a user and a virtual agent. The recording may be in various forms, such as textual, audio, video, audio-video, etc.

The trace includes one or more dialog events, also referred to as state variable instantiations (or values). By way of example, in the context of a chatbot platform for booking a vacation, a state variable may be field such as a date and time of departure, the date and time of return, the destination location, hotel accommodations, vehicle (e.g., automobile) rental, etc. The traces include dialog events (or state variable instantiations) representing the information or data entered by the user for the date and time of departure, the date and time of return, the destination location, hotel accommodations, vehicle rentals, etc. For example, the automated virtual dialog agent may pose each of the state variables to the user as a query, with the user providing a response or instantiation.

The conversation logs are subject to processing by an artificial intelligence (AI) platform (such as AI platform (150) of FIG. 1) to facilitate and enable clustering of the logs. More specifically, according to an exemplary embodiment the AI platform parses the dialog events (or state variable instantiations) of the traces of the conversation log files into parsed events (304), and extracts behavioral characteristics from the traces (e.g., from the parsed events (304) or from the trace as a whole) and assigns a behavioral characteristic value to each of the traces (306). According to an embodiment, the behavioral characteristic is a successful completion of (or failure to successfully complete) the transaction, interaction, or other activity.

The AI platform further subjects the traces to a clustering process based on proximity of the behavioral characteristic values of the traces and outcome values (308). According to an exemplary embodiment, each cluster formed at step (308) is populated with conversation logs that have the same or similar behavioral characteristic values to a respective outcome value of one of the clusters. The output is a plurality of clusters, e.g., $Cluster_0$, $Cluster_1$, . . . $Cluster_N$ (310). In an exemplary embodiment, the number of clusters formed is at least two, and preferably is two, although this quantity should not be considered limiting.

Figure 4:
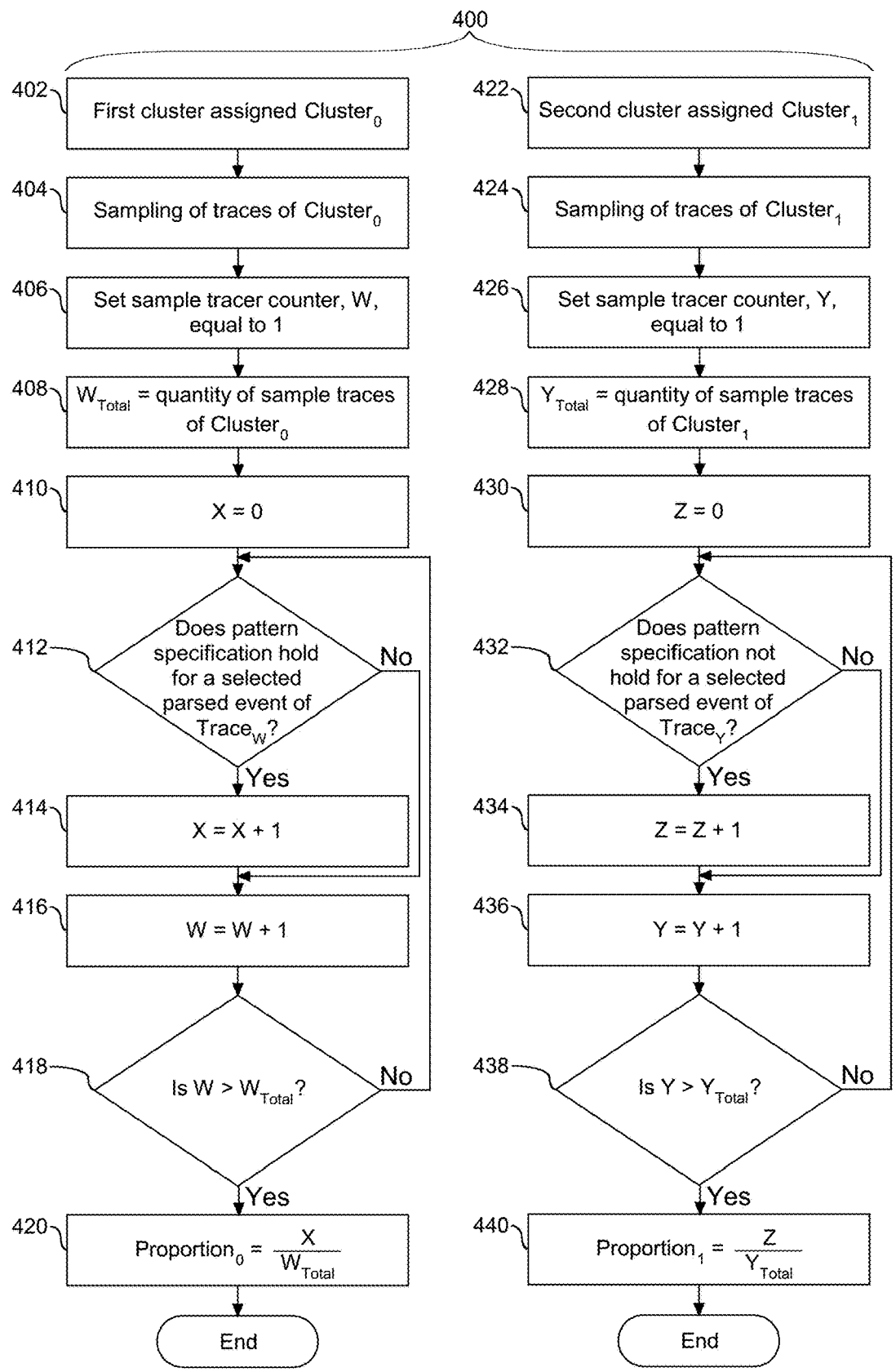
FIG. 4 depicts a flowchart illustrating an embodiment of a method of searching clustered traces.

Referring to FIG. 4, a flowchart (400) is provided to illustrate a process for searching the clusters formed in FIG. 3, and more specifically for assessing parsed events of the traces assigned to the clusters. For the purposes of FIG. 4, two clusters, i.e., $Cluster_0$ and $Cluster_1$ are shown. It is understood that the quantity of traces assigned to either one of the formed clusters may be extensive, and as such, a sampling of the traces may be applied for cluster analysis. As such, an AI learning program is leveraged to identify a sampling of traces from each of $Cluster_0$ and $Cluster_1$ for the search analysis (402). In an exemplary embodiment, the search analysis is directed to $Cluster_0$ and $Cluster_1$ formed in accordance with the flowchart (300) of FIG. 3 (see, e.g., step (310)), with the traces or a sampling of the traces of each cluster subject to the analysis. As illustrated in FIG. 4, the analysis of the clusters may take place in parallel. In an alternative embodiment, the analysis of the clusters may take place in a serial manner or some other manner or sequence, including alternatingly or randomly selecting and assessing traces from the first and second clusters.

In steps (404) and (424), the traces from the cluster, e.g. such as $Cluster_0$ and $Cluster_1$, are sampled. Sampling may be random or may involve any sampling technique, including those known in the art. In an embodiment, a first select quantity of sample traces is assigned to the first cluster, $Cluster_0$, (404), and a second select quantity of sample traces is assigned to the second cluster, $cluster_1$, (424). With respect to the first cluster, a first sample trace counting variable, W, for the sample traces of the first cluster $Cluster_0$ is initialized (406). The quantity of sample traces assigned to the first cluster $Cluster_0$ is identified and assigned to the variable $W_{Total}$ (408). Thereafter, a corresponding trace evaluation variable for the first cluster is initialized at (410). Following step (410) a pattern specification evaluation for the first cluster is conducted, with the variable X representing the quantity of sample traces in the first cluster that meet the corresponding temporal logic to be applied and the variable Z representing the quantity of sample traces in the second cluster that do not meet the corresponding temporal logic to be applied.

Similar to the first cluster, the second cluster is subject to processing. As shown, a second sample trace counting variable, Y, for sample traces of the second cluster $Cluster_1$ is initialized (426). The quantity of sample traces assigned to the second cluster $Cluster_1$ is identified and assigned to the variable $Y_{Total}$ (428). Accordingly, traces from the sampling are assigned to the respective clusters, and corresponding cluster and logic variables are defined and initialized.

There are two aspects to the evaluation of the first cluster at step (412), including selecting a pattern specification entailing a temporal condition and a variable specification corresponding to a parsed event, and evaluating the parsed event corresponding to the selected variable specification with respect to the temporal condition of the selected pattern specification. In an embodiment, the evaluation at step (412) employs sampling-based inference to search a condition (or property) in the form of linear temporal logic (LTL) of the selected pattern specification. The pattern specification evaluation at step (412) includes asserting types of temporal conditions to extract, such as a condition that always holds through the conversation trace, a condition that follows or is preceded by another condition, etc. The pattern specification can be selected from library of pattern specifications. Each of the pattern specifications in the library can be associated with a weighted value, e.g., a probability distribution. Similarly, the variable specification can be selected from the same or a different library. In an embodiment, a selection of the pattern specification and the variable specification for consideration and associated weighted value (e.g., favorability), e.g. via probability distribution, in the searched properties is configurable.

With respect to the first cluster $Cluster_0$, in step (412) a determination is made whether the temporal condition of the selected pattern specification holds true for at least one parsed event corresponding to the selected variable specification for a sample trace, e.g., $Trace_w$. For example, the selected pattern specification applied to the parsed event(s) corresponding to the selected variable specification may involve implementation of linear temporal logic (LTL) to the parsed event(s) (or state variable). According to the embodiment, the pattern specification may be whether a first condition such as successful completion of a dialog event leads to the outcome of the $Cluster_0$. For example, step (412) may comprise a decision whether satisfying the user's specification of travel departure time (the state variable instantiation) holds with respect to the outcome of the sample traces of the first cluster $Cluster_0$, with the outcome being, e.g., successful booking. A positive response to the determination at step (412) is followed by an increment of the trace logic counting variable X (414), with X representing the sample traces of $Cluster_0$ that meet the logic of the pattern specification. However, a negative response to the determination at step (412), the trace logic counting variable X is not incremented at (414). Following the negative response at step (412) or following step (414) in the case of a positive response at step (412), the trace counting variable W is incremented (416). It is then determined if each of the sample traces in the first cluster have been assessed (418). A negative response at step (418) is followed by a return to step (412) for continued processing of the traces sampled from the first cluster $Cluster_0$. However, a positive response at step (418) is an indication that the sampling of traces assigned to the first cluster, $Cluster_0$, has been assessed with respect to the cluster pattern specification and variable specification. As shown, a proportion, $Proportion_0$, for the first $Cluster_0$ is assessed (420), shown herein as a quotient of the value of the quantity of sample traces that have met the pattern specification X and the quantity of sample traces assigned to the first cluster, i.e., $X/W_{Total}$. In exemplary embodiments, the $Proportion_0$ is in a range of 0 to 1, including all tenths or hundredths there between.

Similar to the first cluster, the traces sampled from the second cluster $Cluster_1$ are also subject to the same pattern specification and the same variable specification as the traces of the first cluster $Cluster_0$, although in this case to identify a proportion of sample traces assigned to the second cluster $Cluster_1$ for which a selected parsed event corresponding to the selected variable specification does not meet the pattern specification. With respect to the second cluster $Cluster_0$, at step (432) a determination is conducted to assess if the selected pattern specification (i.e., the same pattern specification of step (412)) does not hold for the parsed event(s) corresponding to the same variable specification selected for step (412). For example, the pattern specification applied to a selected variable specification may involve implementation of linear temporal logic (LTL) to the parsed event(s) corresponding to the selected variable specification. According to the embodiment, the pattern specification may be whether a first condition such as successful completion of a dialog event leads to the outcome of the $Cluster_1$. For example, step (432) may comprise a decision whether satisfying the user's specification of travel departure time (the state variable instantiation) does not hold true with respect to the outcome of the sample traces of the second cluster $Cluster_1$, with the outcome being, e.g., unsuccessful booking.

A positive response to the determination at step (432) (e.g., that satisfaction of the user's specification of travel departure date does not hold with respect to unsuccessful booking outcomes) is followed by an increment of the trace logic counting variable Z (434), with Z representing the sample traces that do not meet the logic of the pattern specification. However, a negative response to the determination at step (432) is not followed by an increment to the trace logic counting variable Z. Following a negative response at step (432) or an increment at step (434), the trace counting variable Y is incremented (436). It is then determined if all the sample traces of the second cluster $Cluster_1$ have been assessed (438). A negative response at step (438) is followed by a return to step (432) for continued processing of the sample traces assigned to the second cluster, $Cluster_1$. However, a positive response at step (438) is an indication that the traces sampled from the second cluster have been assessed with respect to the cluster pattern specification and variable specification. As shown, a Proportion$_1$ for the second cluster Cluster$_1$ is assessed (440), shown herein as a quotient of the value of the quantity of sample traces that have not met the selected pattern specification for the selected variable specification and the quantity of sample traces assigned to the second cluster Cluster$_1$, i.e., $Z/Y_{Total}$. In an exemplary embodiment, the Proportion$_1$ is in a range of 0 to 1, including all tenths or hundredths there between.

The flowchart (400) of FIG. 4 has been described above with respect to one selected pattern specification and one selected variable specification. In an embodiment, the steps of the flowchart (400) may be repeated for other combinations of pattern and variable specifications.

Figure 5:
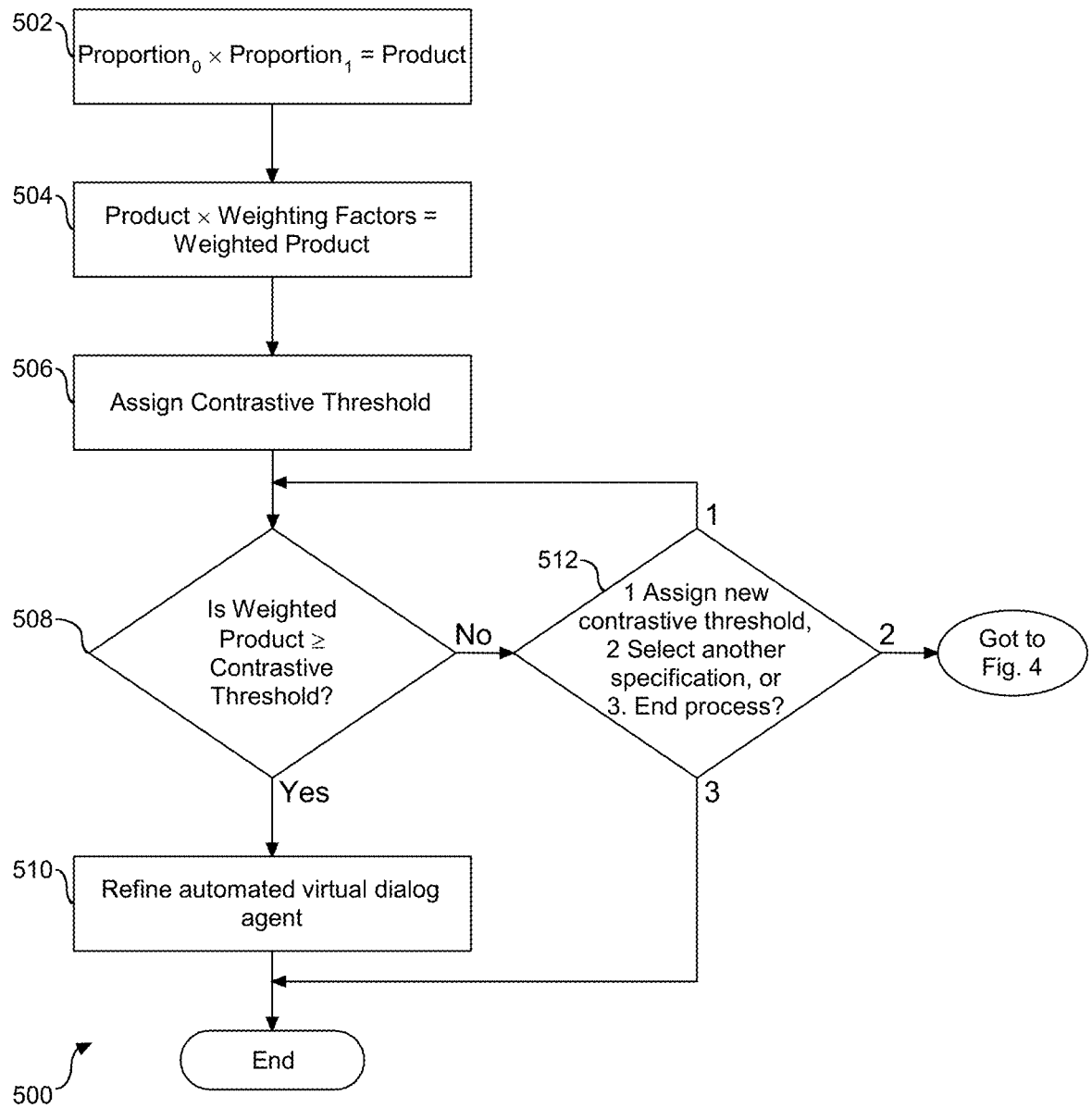
FIG. 5 depicts a flowchart illustrating an embodiment of a method of determining whether a contrastive threshold has been satisfied.

Referring to FIG. 5, a flowchart (500) is provided to illustrate a process for leveraging the cluster formation and evaluation to determine whether there is a contrastive pattern in the traces that satisfies a contrastive threshold, and if so, refine the virtual dialog agent. The contrastive pattern has a value based on the first proportion, Proportion$_0$, of the first cluster, Cluster$_0$, and the second proportion, Proportion$_1$, of the second cluster, Cluster$_1$, as assessed in FIG. 4. In an exemplary embodiment, the first and second proportions are multiplied by one another to provide a product value (502). At step (504), the product value of step (502) is multiplied by one or more weighting factors to determine a weighed product, which represents a value of the contrastive pattern. According to exemplary embodiments, each of the weighting factors is in a range of 0 to 1, including all tenths or hundredths there between. According to an embodiment, a weighting factor is a pattern specification weighting factor based on, e.g., the importance assigned to the pattern specification. According to another embodiment, the weighting factor is a variable specification weighting factor based on, e.g., the importance assigned to the variable specification. For example, the variable specification relating to satisfaction of the departure dates may have high importance to the programmer and hence be assigned a weighting value near 1, wherein the variable specification relating to the satisfaction of a vehicle rental may have low importance and hence be assigned a weighting value near 0. In one embodiment, the weight application to the pattern specification and/or the variable specification may be omitted or set to 1. Similarly, in one embodiment, a value of the weight may be configurable.

At step (506), a contrastive threshold is assigned. In exemplary embodiments, the contrastive threshold is selected as a value in a range of 0 to 1, including any increment (e.g., tenth, hundredth, etc.) within the range of 0 to 1. The contrastive threshold may be selected by the programmer or by the AI platform (150). It is then determined if the contrastive pattern value, which is described above as the weighted product in an exemplary embodiment, satisfies (e.g., equals or is greater than) the contrastive threshold (508). A positive response to the determination (508) is followed by creating output corresponding to a refinement to the virtual agent in association with the parsed event(s) to improve performance of the dialog system (510). A negative response to the determinations at step (508) is followed by a decision (512) of one or more options to proceed. Options include, for example, assigning a new contrastive threshold and returning to step (508); selecting another pattern specification and/or variable specification and returning to flowchart (400) of FIG. 4; and ending the process.

The contrastive threshold can be based on various factors, including, for example, satisfaction and complexity. Satisfaction includes calculating a degree in which the searched properties align with the input conversation traces, and in one embodiment, maximizes highlighting any differences across the input sets. In addition, the satisfaction includes checking alignment and non-alignment of LTL properties on the input traces. The complexity aspect of the contrast assessment incentivizes low-complexity specifications in terms of having fewer propositions, and also promotes conciseness and interpretability within the searched properties.

Exemplary methods described herein, including those illustrated in the flowcharts of FIGS. 3-5, create output in the form of temporal properties describing differences between the sets of traces. Following the enumerated steps, according to an exemplary embodiment a determination is conducted to assess availability of domain knowledge describing how the traces are generated, such as a planning language, e.g. PDDL. As discussed above, exemplary embodiments involve assigning weighted values to pattern specifications and variable specifications depending on the perceived importance. PDDL is one example of a planning language which is commonly used to write planning problems. PDDL consists of an environment with a set of states, including a start state and a goal state. The model aims to find a path, e.g. a trace, from the start state to the goal state. Accordingly, as demonstrated herein, discriminative patterns between group behaviors are automatically extracted and corresponding contrastive explanations are searched and applied to the chatbot platform for selective modification.

Embodiments shown and described herein may be in the form of a computer system for use with an intelligent computer platform for processing and analyzing conversation dialog records, particularly in connection with improving the performance of a dialog system. A processing unit is operatively coupled to memory and is in communication with an artificial intelligence platform.

Aspects of the conversation log file and record processing shown in FIGS. 1-5, employs one or more functional tools, as shown and described in FIG. 1. Aspects of the functional tools (152), (154), (156), (158), and (164) and their associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the processes described above with respect to FIGS. 3-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
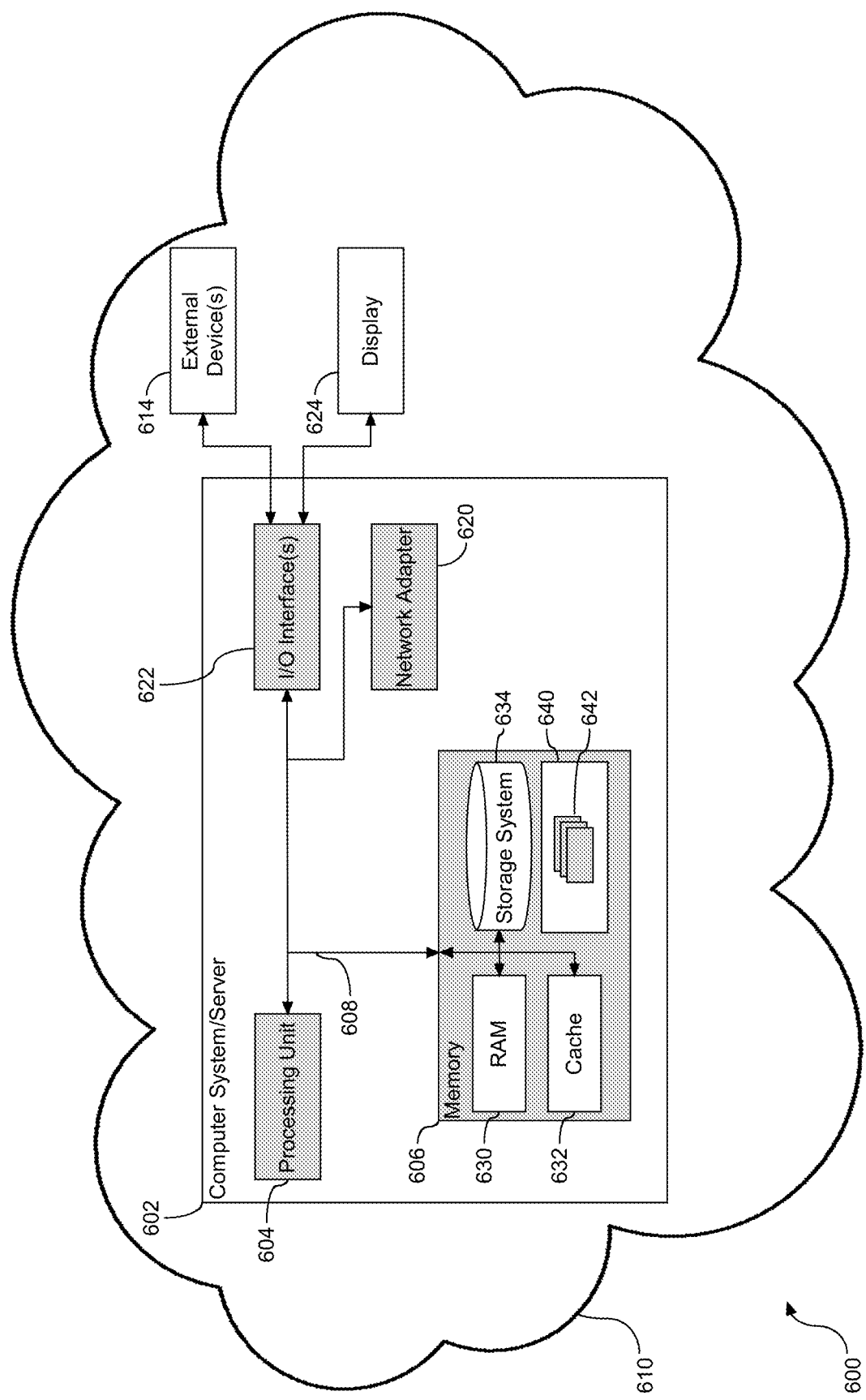
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to leverage logic, e.g. temporal logic, to improve performance of the automated virtual dialog agent. For example, the set of program modules (642) may include the tools (152), (154), (156), (158), and (164) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In an embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In an embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
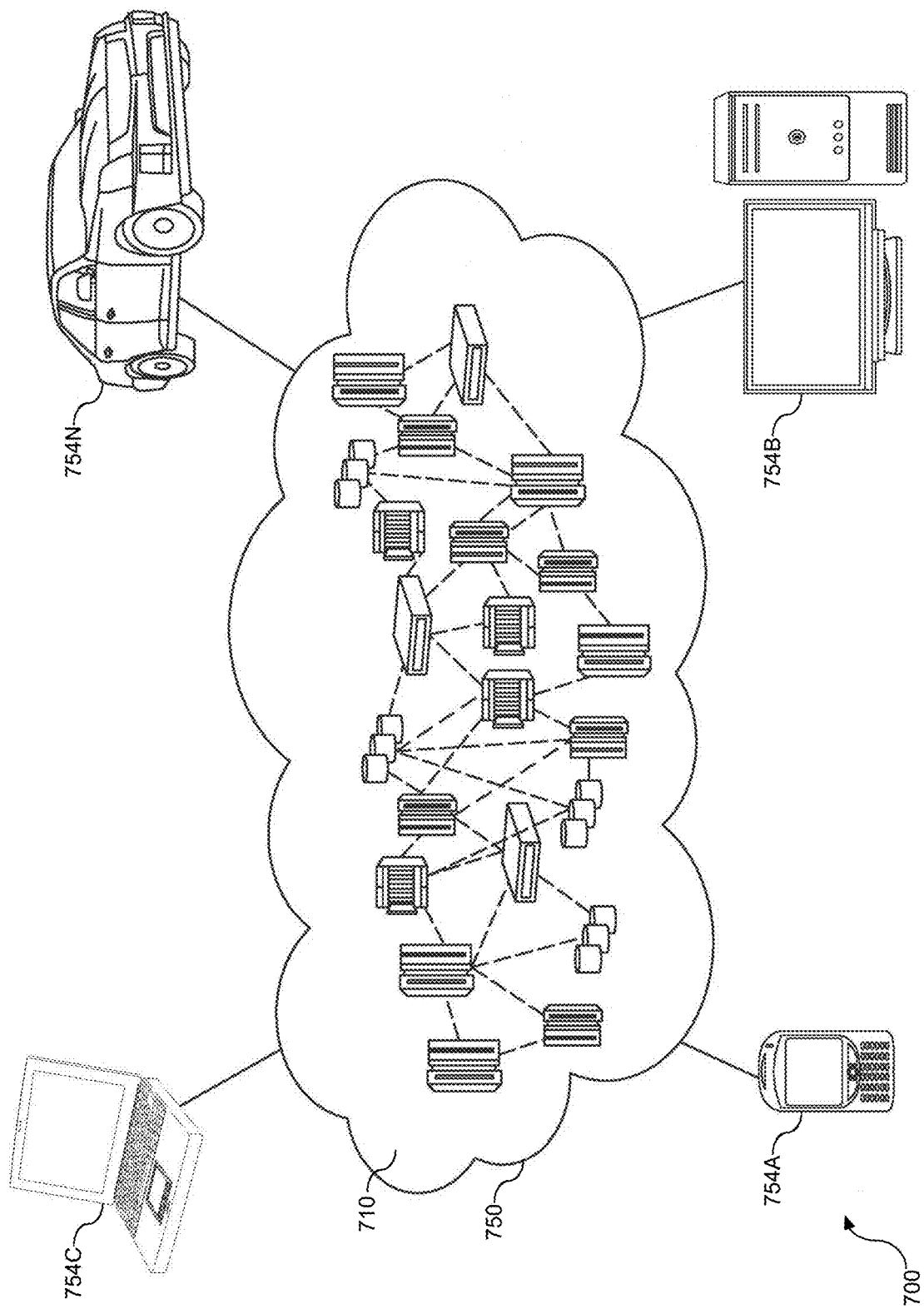
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
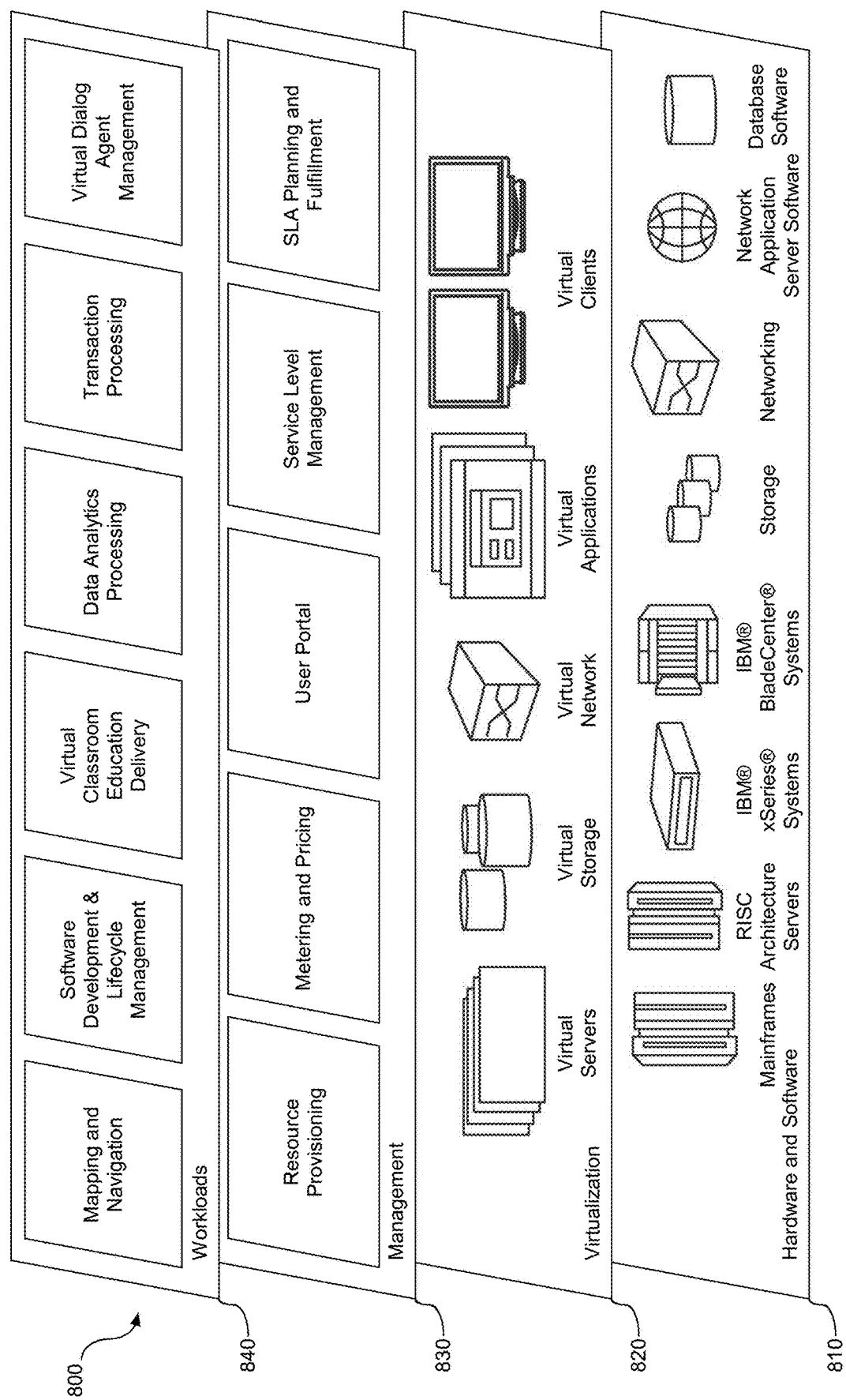
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and virtual dialog agent management.

It will be appreciated that there is disclosed herein a system, method, apparatus, and computer program product for evaluating natural language input, detecting an interrogatory in a corresponding communication, and resolving the detected interrogatory with an answer and/or supporting content processing conversation log records and producing output that may be used to improve the performance of a dialog system.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve interrogatories with intent identification and a corresponding response related to the identified intent.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
   a processing unit operatively coupled to memory to receive a plurality of conversation log files relating to interactions with an automated virtual dialog agent of a dialog system, each of the conversation log files comprising a trace of one or more dialog events; and
   an artificial intelligence (AI) platform in communication with the processing unit, the AI platform comprising:
      a trace manager configured to:
         parse the dialog events of the traces of the conversation log files into a plurality of parsed events; and
         extract respective behavioral characteristics from and assign respective behavioral characteristic values to the traces;

a cluster manager, operatively coupled to the trace manager, configured to cluster the traces into a plurality of clusters based on proximity of the respective behavioral characteristics values of the traces to respective outcome values, the plurality of clusters comprising a first cluster of the traces having the respective behavioral characteristic values proximate to a first outcome value representing a first outcome and a second cluster of traces having the respective behavioral characteristic values proximate to a second outcome value representing a second outcome that is different than the first outcome;

a search manager, operatively coupled to the cluster manager, configured to search the plurality of parsed events for a contrastive pattern, including applying a pattern specification entailing a temporal condition to at least one parsed event of the plurality of parsed events; and for the at least one parsed event, the search manager configured to determine whether the contrastive pattern satisfies a contrastive threshold, wherein the contrastive pattern is based on a first proportion of the traces of the first cluster for which the pattern specification holds true and a second proportion of the traces of the second cluster for which the pattern specification holds not true; and an output manager configured to apply output from the AI platform to the automated virtual dialog agent in relation to the dialog event corresponding to the at least one parsed event to improve performance of the dialog system.

2. The system of claim 1, wherein the search manager to determine whether the contrastive pattern satisfies the contrastive threshold comprises the search manager configured to multiply the first proportion by the second proportion to calculate a contrastive pattern value and compare the calculated contrastive pattern value to the contrastive threshold.

3. The system of claim 1, wherein the search manager to determine whether the contrastive pattern satisfies the contrastive threshold comprises the search manager configured to multiply the product of the first and second proportions by a weighting value in a range of 0 to 1 to calculate a contrastive pattern value and compare the calculated contrastive pattern value to the contrastive threshold.

4. The system of claim 1, wherein the behavior characteristics comprise a successful transaction by the dialog system and an unsuccessful transaction by the dialog system, respectively.

5. The system of claim 1, wherein the search manager applying a pattern specification entailing a temporal condition comprises the search manager configured to select the pattern specification from a plurality of pattern specifications, the plurality of pattern specifications stored in a first library.

6. The system of claim 5, wherein the search manager applying a pattern specification entailing a temporal condition to at least one parsed event of the plurality of parsed events comprises the search manager configured to select a variable specification corresponding to the at least one parsed event from a plurality of variable specifications stored in a second library, wherein the first and second libraries may be the same or different libraries.

7. A computer program product for improving performance of a virtual dialog agent system, the computer program product comprising:

a computer readable storage medium having program code embodied therewith, the program code executable by a processor to:

receive a plurality of conversation log files relating to interactions with an automated virtual dialog agent of a dialog system, the conversation log files comprising respective traces comprising one or more dialog events; and apply the received conversation log files to an artificial intelligence (AI) platform comprising a learning program configured to:

parse the dialog events of the traces of the conversation log files into a plurality of parsed events;

extract respective behavioral characteristics from and assign respective behavioral characteristic values to the traces;

cluster the traces into a plurality of clusters based on proximity of the respective behavioral characteristics values of the traces to respective outcome values, the plurality of clusters comprising a first cluster of the traces having the respective behavioral characteristic values proximate to a first outcome value representing a first outcome and a second cluster of traces having the respective behavioral characteristic values proximate to a second outcome value representing a second outcome that is different than the first outcome;

search the plurality of parsed events for a contrastive pattern, the searching comprising applying a pattern specification entailing a temporal condition to at least one parsed event of the plurality of parsed events; and for the at least one parsed event, determine whether the contrastive pattern satisfies a contrastive threshold, wherein the contrastive pattern is based on a first proportion of the traces of the first cluster for which the pattern specification holds true and a second proportion of the traces of the second cluster for which the pattern specification holds not true; and apply output from the AI platform to the automated virtual dialog agent in relation to the dialog event corresponding to the at least one parsed event to improve performance of the dialog system.

8. The computer program product of claim 7, wherein the program code to determine whether the contrastive pattern satisfies the contrastive threshold comprises program code executable by the processor to multiply the first proportion by the second proportion to calculate a contrastive pattern value and compare the calculated contrastive pattern value to the contrastive threshold.

9. The computer program product of claim 7, wherein the program code to determine whether the contrastive pattern satisfies the contrastive threshold comprises program code executable by the processor to multiply the product of the first and second proportions by at least one weight value in a range of 0 to 1 to calculate a contrastive pattern value and compare the calculated contrastive pattern value to the contrastive threshold.

10. The computer program product of claim 7, wherein the behavior characteristics comprise a successful transaction by the dialog system and an unsuccessful transaction by the dialog system, respectively.

11. The computer program product of claim 7, wherein the program code to apply a pattern specification entailing a temporal condition comprises program code executable by the processor to select the pattern specification from a plurality of pattern specifications stored in a first library.

12. The computer program product of claim 11, wherein the program code to apply a pattern specification entailing a temporal condition to at least one parsed event of the plurality of parsed events comprises program code executable by the processor to select a variable specification corresponding to the at least one parsed event from a plurality of variable specifications stored in a second library, wherein the first and second libraries may be the same or different libraries.

13. A machine-implemented method of improving performance of a dialog system, the method comprising:
receiving, by a processor of a computing device, a plurality of conversation log files relating to interactions with an automated virtual dialog agent of a dialog system, the conversation log files comprising respective traces comprising one or more dialog events;
applying, by the processor, the received conversation log files to an artificial intelligence (AI) platform comprising a learning program, the applying comprising:
parsing the dialog events of the traces of the conversation log files into a plurality of parsed events;
extracting respective behavioral characteristics from and assigning respective behavioral characteristic values to the traces;
clustering the traces into a plurality of clusters based on proximity of the respective behavioral characteristics values of the traces to respective outcome values, the plurality of clusters comprising a first cluster of the traces having the respective behavioral characteristic values proximate to a first outcome value representing a first outcome and a second cluster of traces having the respective behavioral characteristic values proximate to a second outcome value representing a second outcome that is different than the first outcome;
searching the plurality of parsed events for a contrastive pattern, the search comprising applying a pattern specification entailing a temporal condition to at least one parsed event of the plurality of parsed events; and
for the at least one parsed event, search whether the contrastive pattern satisfies a contrastive threshold, wherein the contrastive pattern is based on a first proportion of the traces of the first cluster for which the pattern specification holds true and a second proportion of the traces of the second cluster for which the pattern specification holds not true; and
refining the automated virtual dialog agent in relation to the dialog event corresponding to the at least one parsed event to improve performance of the dialog system.

14. The machine-implemented method of claim 13, wherein the determining whether the contrastive pattern satisfies the contrastive threshold comprises multiplying the first proportion by the second proportion to calculate a contrastive pattern value and comparing the calculated contrastive pattern value to the contrastive threshold.

15. The machine-implemented method of claim 13, wherein the determining whether the contrastive pattern satisfies the contrastive threshold comprises multiplying the product of the first and second proportions by a weighting value in a range of 0 to 1 to calculate a contrastive pattern value and comparing the calculated contrastive pattern value to the contrastive threshold.

16. The machine-implemented method of claim 13, wherein the behavior characteristics comprise a successful transaction by the dialog system and an unsuccessful transaction by the dialog system, respectively.

17. The machine-implemented method of claim 13, wherein the applying a pattern specification entailing a temporal condition comprises selecting the pattern specification from a plurality of pattern specifications stored in a first library.

18. The machine-implemented method of claim 17, wherein the applying a pattern specification entailing a temporal condition to at least one parsed event of the plurality of parsed events comprises selecting a variable specification corresponding to the at least one parsed event from a plurality of variable specifications stored in a second library, wherein the first and second libraries may be the same or different libraries.

19. The machine-implemented method of claim 13, wherein the refining comprises refining, using the processor, the automated virtual dialog agent in relation to the dialog event corresponding to the at least one parsed event to improve performance of the dialog system.

* * * * *